United States Patent [19]

Marsh et al.

[11] 3,997,197

[45] Dec. 14, 1976

[54] BALL AND SOCKET PIPE COUPLING

[75] Inventors: Gerald A. Marsh; Eugene O. Lee; James A. Burton; Raymond E. Latham, all of Houston, Tex.

[73] Assignee: HydroTech International, Inc., Houston, Tex.

[22] Filed: Oct. 8, 1974

[21] Appl. No.: 513,056

[52] U.S. Cl. ................................ 285/93; 285/261; 285/315; 285/320; 285/420; 285/DIG. 21

[51] Int. Cl.[2] ........................................ F16L 35/00

[58] Field of Search .......... 285/261, 263, 271, 266, 285/267, 320, 268, 93, 264, 315, 270, 420, 18, 24, 27, 322, DIG. 21; 166/.6, .5; 244/135 A

[56] References Cited

UNITED STATES PATENTS

| | | | |
|---|---|---|---|
| 2,199,588 | 5/1970 | Cobham et al. | 244/135 A |
| 2,634,926 | 4/1953 | Worlidge | 285/DIG. 21 |
| 2,634,927 | 4/1953 | Smith et al. | 285/DIG. 21 |
| 2,803,473 | 8/1957 | Hohmann | 285/261 X |
| 3,450,421 | 6/1969 | Horwell | 285/315 X |
| 3,656,307 | 4/1972 | Mott | 285/320 |
| 3,695,633 | 10/1973 | Hanes | 285/315 X |
| 3,717,920 | 2/1973 | Oliver et al. | 285/315 |
| 3,860,270 | 1/1975 | Arnold | 285/93 |

*Primary Examiner*—Dave W. Arola

[57] ABSTRACT

A ball and socket type coupling for connecting the ends of two pipes which may be axially misaligned by as much as several degrees. It includes a pair of coupling members, each of which is arranged for connection to one of the pipes to be connected. One of the members has attached at the other end thereof a ball portion, and the other coupling member has attached thereto a housing arranged for receiving in mating relationship therewith the forward surface of the ball portion. Seal means are disposable between the ball and the housing member for providing a fluid seal therebetween. A plurality of cam members are supported in circumferentially spaced about positions in the housing and pivotally movable between a retracted position to permit the receiving portion of the housing to freely receive the ball in mating engagement with the internal surface thereof, and an extended and locked position of engagement with the rearward side of the ball at a plurality of circumferentially spaced about points and so arranged to urge the ball into continual positive contact with the housing, whereby the coupling members are restrained against relative axial separation. Means are also provided for pivoting the cam members to the extended and locked position and subsequently to the retracted and unlocked position, should the latter become desirable.

9 Claims, 5 Drawing Figures

60
68
66
42
70
24
40
52
56
44
26
62
54
58
28
34
22
30
18
32
64
6
25
8
10
12
10
8
20
14
16
4
64
25
62
22
60
70
26
68
66

82
86
80
18
80
22
78
72
84
78

104
102
18
88
92
94
90

98
22
100
96

BALL AND SOCKET PIPE COUPLING

BACKGROUND OF THE INVENTION a. Field of the Invention

This invention relates broadly to a coupling of the ball and socket type for connecting together the ends of two pipes ordinarily located in a sub-sea environment. In particular, the invention has regard to an improved coupling of this type which is capable of rigidly connecting together pipe ends which may be misaligned relative to each other.

b. Description of the Prior Art

It is known to connect misaligned pipe ends located in a sub-sea environment with a ball and socket type coupling where the socket includes jaws for engaging the back side of the ball to hold it within the socket. However, in many instances such couplings are articulated to enable relative movement between the pipe ends. In other instances, the socket jaws take the form of a snap-ring, making it difficult to assemble the ball and socket together; this being a major drawback because of the fact that working conditions in a sub-sea environment are substantially limited in terms of visibility, maneuverability and the like. In addition, certain prior art couplings require the jaws to be held at least partially within the confines of the socket, thus necessitating an intricate network of pistons, cylinders, and conduits, also located within the confines of the socket, to procure hydraulic actuation of the jaws either towards or away from their ball engaging position.

SUMMARY OF THE INVENTION

Accordingly, a main object of the present invention is to overcome the aforesaid disadvantages by providing an improved pipe coupling of the ball and socket type which is capable of rigidly connecting together pipe ends which may be misaligned relative to each other.

Another object of the present invention is to provide a pipe coupling having ball and socket coupling members which are simple in design and easy to assemble to thereby effect a quick connect coupling.

A related object of the present invention is to provide a pipe coupling of the ball and socket type in which the setting means for the jaws are disposable externally of the socket.

To achieve the foregoing and other objects of the invention, both stated and unstated hereinafter, the invention provides apparatus for connecting the ends of two pipes and comprises in combination: a pair of coupling members, each of which is connectible at one end thereof to the end of one of the pipes to be connected. One of the coupling members has attached to the other thereof an annular spherically-shaped ball-like enlarged portion having axially forward and rearward sides. The other coupling member has attached to the other end thereof a socket or housing having an internal surface portion for receiving the spherically-shaped forward side of the enlarged portion in mating engagement therewith, thereby enabling the central axes of the respective coupling members to be inclined at an angle relative to each other for connecting similarly inclined pipe ends. Seal means are disposable between the enlarged portion and the housing for providing a fluid seal therebetween. A plurality of jaws or cam members are supported in circumferentially disposed relation about the housing and pivotally movable between a retracted position to permit the internal surface portion of the housing to freely receive the spherically-shaped forward side of the enlarged portion in mating engagement therewith, and an extended and locked position to engage the spherically-shaped rearward side at a plurality of points circumferentially thereabout, to thereby urge the enlarged portion into continual positive contact with the housing to restrain the coupling members against relative axial separation. Means are also provided for moving the cam members towards the extended and locked position.

Other objects of the invention more or less broad than the foregoing will become apparent from the following description of the elements, parts and principles of the invention given herein solely by way of example and with reference to the accompanying drawings wherein like reference numerals refer to the like parts of the invention.

DESCRIPTION OF THE PREFERRED EMBODIMENT

Figure 1:
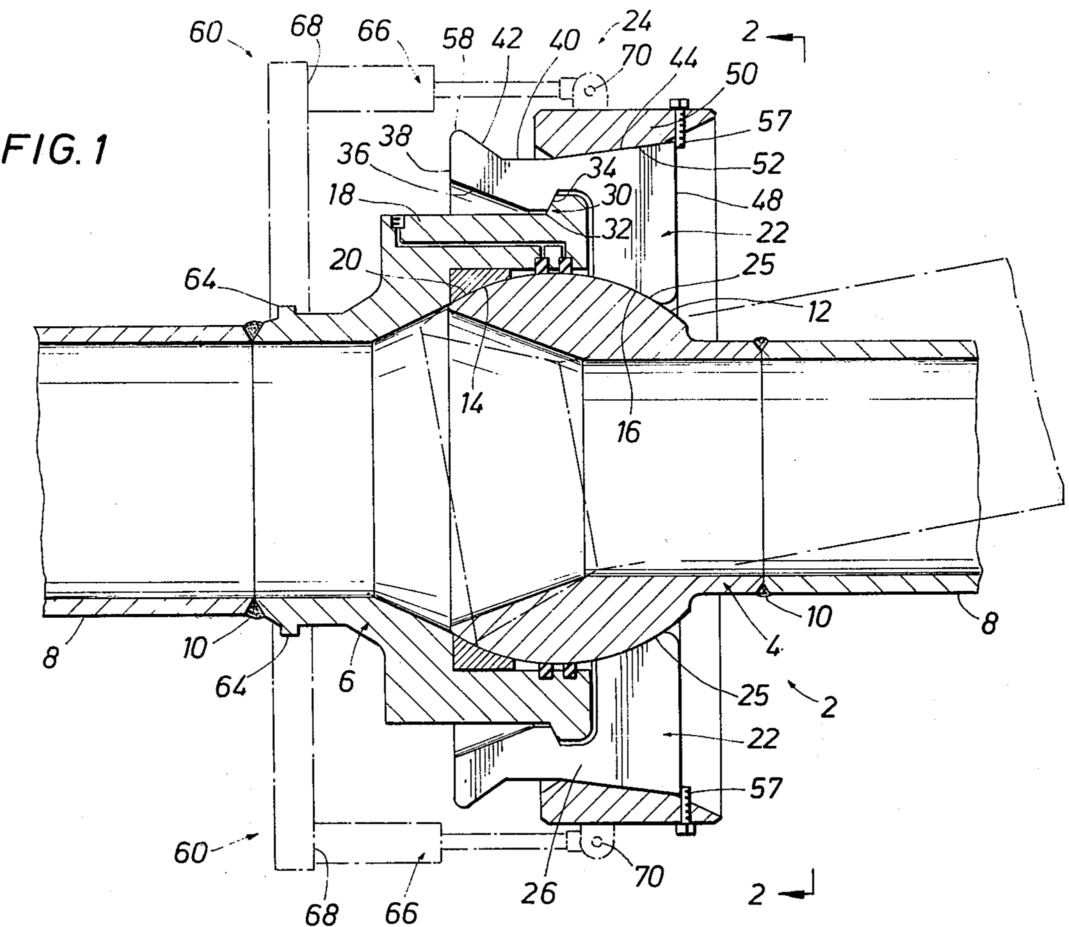
FIG. 1 is a sectional view of the coupling members in an assembled and locked condition.

One presently preferred embodiment of the coupling apparatus of this invention for connecting together the ends of two pipes according to the present invention is illustrated generally in FIG. 1. As shown therein, coupling 2 includes a pair of coupling members 4 and 6, each of which is suitably connected at one end thereof to the end of one of the pipes 8 as at 10. Coupling member 4 has attached to the other end thereof an annular, spherically-shaped ball-like enlarged portion 12 having axially forward and rearward sides 14 and 16 respectively. Coupling member 6, on the other hand, has attached to the other end thereof a socket or housing 18 having portion 20 with a spherical-shaped internal surface for receiving the spherically-shaped forward side 14 in mating engagement therewith, as shown in FIG. 1. This ball and socket arrangement enables the central axes of coupling members 4 and 6 to be inclined at an angle relative to each other, whereby similarly inclined pipe ends as illustrated by the dotted and solid line positions of said coupling members 4 and 6 respectively can be connected.

It will be understood that forward and rearward sides 14 and 16 will include those spherically-shaped surface portions of enlarged portion 12 which are respectively engaged with internal surface portion 20 and cam members (yet to be described) irrespective of any relative misalignment between coupling members 4 and 6.

Figure 2:
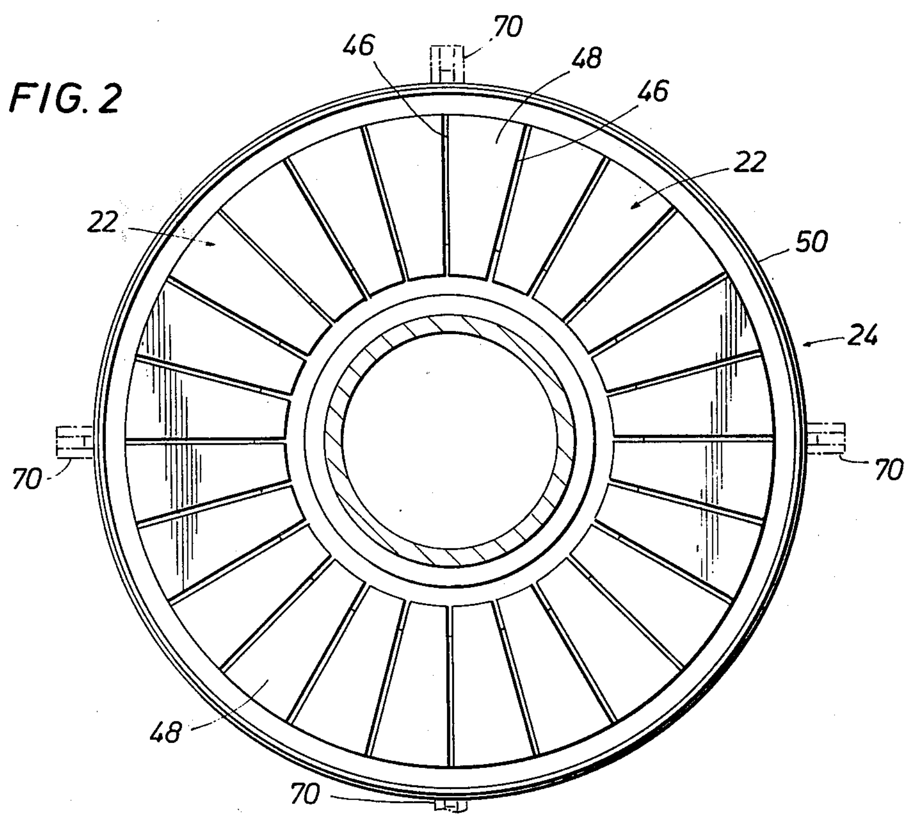
FIG. 2 is a front view of the assembled coupling taken along line 2—2 of FIG. 1.

In addition, a plurality of jaws or cam members 22 (FIG. 1) are supported in circumferentially disposed relation about housing 18 as shown in FIG. 2 and pivotally movable between a retracted position (FIG. 3) to permit portion 20 of said housing 18 to freely receive said spherically-shaped forward side 14 of said enlarged portion 12 in mating engagement with the internal surface thereof as aforesaid, and an extended and locked position (FIG. 1) engaging spherically-shaped rearward side 16 at a plurality of points circumferentially thereabout, to thereby urge enlarged portion 12 into continual positive contact with housing 18, to restrain coupling members 4 and 6 against relative axial and flexing movement. It follows, therefore, that cam members 22 and portion 20 are mutually dependent on each other to restrain coupling members 4 and 6 against such relative axial and flexing movement.

Further, the invention visualizes providing means 24 for moving cam members 22 towards the extended and locked position in a manner to be described hereinafter in greater detail.

As shown in FIG. 1, each cam member 22 includes a leading end 25 which is preferably spherically-shaped to correspond with the spherical contour of enlarged portion 12 along rearward side 16 thereof. In this preferred embodiment of the invention, each cam member 22 also includes a lever portion 26 to enable pivotal movement of cam member 22, as aforesaid. More particularly, each lever portion 26 includes an inwardly disposed lug 28 which is disengageably engaged with fulcrum means 30 as shown in FIG. 1 and movable relative thereto to effect pivotal movement of cam member 22 thereabout. Fulcrum means 30 includes an annular crotch 32 defined between annular wall 34 and housing 18. In addition, lever portion 26 includes an inwardly disposed tapering surface 36 extending from lug 28 to rearward extremity 38 of lever portion 26, surface 36 enabling lever portion 26 to be pivoted to the position shown in FIG. 3. The outer surface of lever portion 26 is saddle-shaped, having a seat 40 disposed between two divergent surfaces 42 and 44 for reasons which will become apparent. Preferably, the outer surfaces of lever portion 26 are convex, while the inner surfaces thereof, including those on said lug 28, are concave. Further, each cam member 22 has opposite sides 46—46 (FIG. 2) which are convergent towards the center axis of housing 18. In addition, cam members 22 are tapered outwardly from rearward extremity 38 to forward extremity 48. This tapered configuration permits nesting of cam members 22 in the extended position as best shown in FIG. 2.

Moving means 24 includes an annular sleeve 50 disposed in encircling relationship about cam members 22, as best shown in FIG. 2. Sleeve 50 is movable axially relative to housing 18 to effect pivotal movement of cam members 22 between the radially retracted position of FIG. 3 and a radially extended and locked position of FIG. 1. More particularly, annular sleeve 50 includes an inwardly disposed tapering surface 52 intermediate a pair of divergent surfaces 54 and 56, said sleeve surfaces being concave for mating engagement with the outer convex lever surfaces of cam members 22. Sleeve surface 54 is designed to engage lever surface 42 when sleeve 50 moves rearwardly towards the position shown in FIG. 3 to bias each cam member 22 to the retracted position as shown in the same view. It is to be understood that surface 56 will be sufficiently removed or spaced from lever surface 44 to enable cam members 22 to assume retracted positions when moved to the rearward position. Sleeve surface 56, on the other hand, serves to engage lever surfaces 44 when sleeve 50 moves forwardly towards the position shown in FIG. 1, to bias each cam member 22 to the extended and locked position, as shown in the same view, it being recognized that surface 54 will be sufficiently removed from said lever surface 42 at this time to enable cam members 22 to assume extended positions. In the extended position shown in FIG. 1, sleeve surface 52 is in engagement with lever surface 44, with both surfaces cooperating to constitute a tapering arrangement which is preferably self-locking. As a measure of protection, however, one or more locking pins 57 may be removably threaded through sleeve 52 to engage the forward extremity 48 of a cam member 22 as shown in FIG. 1. It will be understood that in order to assemble sleeve 50 and cam members 22 together about housing 18, there is sufficient clearance provided between the smallest internal diameter of sleeve 50 and housing 18 to permit sleeve 50 to freely slide from left to right over tips 58 of each lever portion 26 when the latter are disposed in fully cocked positions as viewed by the dotted lines in FIG. 3.

Figure 3:
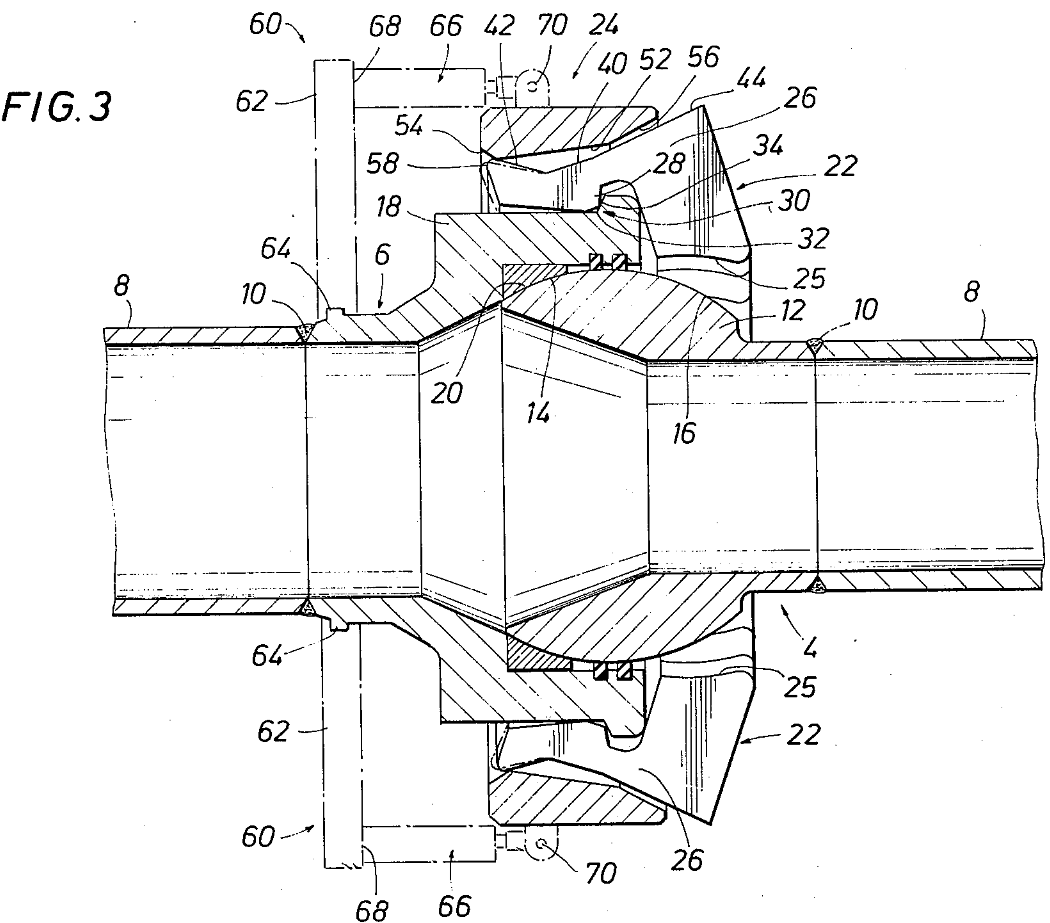
FIG. 3 is a sectional view of the coupling members in an assembled condition, similar to FIG. 1, but showing the parts in the unlocked condition.

To effect axial sliding movement of sleeve 50, the present invention visualized suitable setting means 60 as shown, for example, in FIGS. 1 and 3. Preferably, setting means 60 are disposed externally of coupling 2 and are removable therefrom once coupling 2 has been set or unset as the case may be so that it may be utilized for setting or unsetting other similar couplings. In this embodiment, setting means 60 includes supports 62 which are releasably locked with said coupling member 6 circumferentially thereabout as at points designated by the numeral 64. In addition, conventional hydraulically actuated piston and cylinder devices 66 are connected to supports 62 at points designated by the numeral 68 and extend therefrom towards sleeve 50 to be disengageably engaged therewith as indicated by pivot 70. Devices 66 serve to selectively move sleeve 50 axially between a forward position as shown in FIG. 1 and a rearward position as shown in FIG. 3. Because of the tapering arrangement between sleeve surface 52 and lever surface 44, the force applied by each cam member 22 against rearward side 16 can be increased by merely increasing the forward movement of sleeve 50 to further tighten sleeve 50 around each lever surface 44. Conversely, the force applied by each cam member 22 to rearward side 16 can be decreased by merely moving sleeve 50 on a rearward path.

Figure 4:
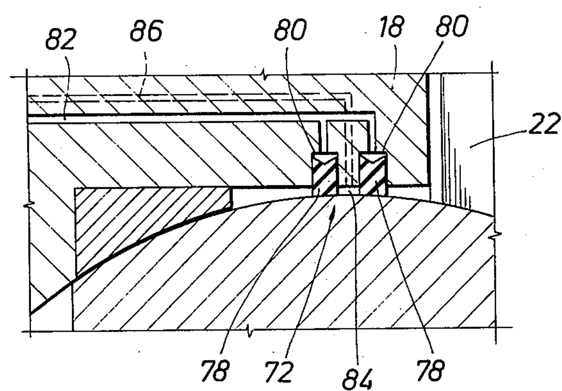
FIG. 4 is an enlarged fragmentary view of the seal means appearing in FIG. 1.

The invention as visualized herein also includes seal means 72 disposed between enlarged portion 12 and housing 18 for providing a fluid seal therebetween. More particularly, seal means 72 includes a pair of axially spaced annular elastomeric seal members 78—78 (FIG. 4) held in grooves 80—80 formed in said housing 18. Grooves 80 in turn are in communication with conduit means 82, which enables pressurized fluid to be applied to seal members 78 to force them into sealing engagement with enlarged portion 12. An annular testing chamber 84 is thus formed between seal members 78. Chamber 84 is in turn in communication with another conduit means 86 which, enables pressurized fluid to be introduced into said chamber 84 to test the effectiveness of seal members 78.

Figure 5:
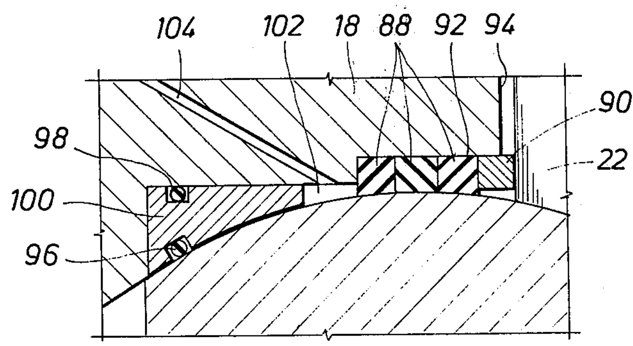
FIG. 5 is an enlarged fragmentary view of an alternate embodiment of the seal means according to the present invention.

An alternate embodiment of the seal means is shown in FIG. 5. Therein, annular elastomeric seal sections 88 and an annular rigid section 90 are shown held in a recess 92 within housing 18. Rigid section 90 projects axially beyond edge 94 of housing 18 so as to be engaged by cam members 22 when the latter are in extended positions, and thereby compress elastomeric seal sections 88 into sealing engagement with enlarged portion 12, as shown. In order to test the effectiveness of seal sections 88, housing 18 includes additional annular elastomeric seal sections 96 and 98 disposed on opposite sides of housing insert 100, shown in this embodiment. Seal sections 96 and 98 are axially spaced from seal sections 88 to define an annular testing chamber 102 therebetween. Chamber 102 is in communication with conduit 104, which enables chamber 102 to be pressurized in a manner similar to chamber 84.

It will thus be observed that this invention provides the art with a new and improved ball and socket type coupling which is comprised of a relatively small number of parts which are easily assembled and operated. Moreover, this invention provides a coupling apparatus which overcomes the various disadvantages of the prior art discussed above and which, nevertheless, may be used to effect a rigid coupling between two pipes, and a coupling which permits the completion of a fail-safe connection between two pipes.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiment. Various changes may be made in the shape, size and arrangement of parts. For example, equivalent elements or materials may be substituted for those illustrated and described herein, parts may be reserved, and certain features of the invention may be utilized independently of the use of other features, all as would be apparent to one skilled in the art after having the benefit of this description of the invention.

What is claimed is:

1. Apparatus for connecting the ends of two pipes comprising:

a pair of coupling members, each of which is connectible at one end thereof to the end of one of said pipes;

one of said coupling members having attached to the other end thereof an annular spherically-shaped enlarged portion having axially forward and rearward sides;

the other coupling member having attached to the other end thereof a housing having a portion with an internal surface for receiving the spherically-shaped forward side of said enlarged portion in mating engagement therewith, thereby enabling the central axes of the respective coupling members to be inclined at an angle relative to each other for connecting similarly inclined pipe ends;

seal means supported by one of said enlarged portions and said housing for providing a seal therebetween in the assembled condition;

a plurality of cam members supported by said housing in circumferentially disposed relation thereabout and pivotally movable between a retracted position to permit said receiving portion of said housing to freely receive the spherically-shaped forward side of said enlarged portion in mating engagement therewith, and an extended and locked position to engage said spherically-shaped rearward side at a plurality of points spaced circumferentially thereabout to urge said enlarged portion into continual positive contact with said housing to restrain said coupling members against relative axial separation;

and means generally encircling said cam members for pivotally moving said cam members towards said extended and locked position and for holding said cam members in said locked position.

2. Apparatus for connecting the ends of two pipes comprising:

a pair of coupling members, each of which is connectible at one end thereof to the end of one of said pipes;

one of said coupling members having attached to the other end thereof an annular spherically-shaped enlarged portion having axially forward and rearward sides;

the other coupling members having attached to the other end thereof a housing having a portion with an internal surface for receiving the spherically-shaped forward side of said enlarged portion in mating engagement therewith, thereby enabling the central axes of the respective coupling members to be inclined at an angle relative to each other for connecting similarly inclined pipe ends, said housing also including an annular wall disposed circumferentially thereabout;

seal means supported by one of said enlarged portions and said housing for providing a seal therebetween in the assembled condition;

a plurality of cam members supported by said housing in circumferentially disposed relation thereabout and pivotally movable between a retracted position to permit said receiving portion of said housing to freely receive the spherically-shaped forward side of said enlarged portion in mating engagement therewith, and an extended and locked position to engage said spherically-shaped rearward side at a plurality of points spaced circumferentially thereabout to urge said enlarged portion into continual positive contact with said housing to restrain said coupling members against relative axial separation, with each of said cam members including a lug portion engageable with said annular wall when said cam member pivots toward said extended and locked position;

and means for pivotally moving said cam members toward said extended and locked position and for holding said cam members in said locked position.

3. Apparatus for connecting the ends of two pipes comprising:

a pair of coupling members, each of which is connectible at one end thereof to the end of one of said pipes;

one of said coupling members having attached to the other end thereof an annular spherically-shaped enlarged portion having axially forward and rearward sides;

the other coupling member having attached to the other end thereof a housing having a portion with an internal surface for receiving the spherically-shaped forward side of said enlarged portion in mating engagement therewith, thereby enabling the central axes of the respective coupling members to be inclined at an angle relative to each other for connecting similarly inclined pipe ends;

seal means supported by one of said enlarged portions and said housing for providing a seal therebetween in the assembled condition;

a plurality of cam members supported by said housing circumferentially disposed relation thereabout and pivotally movable between a retracted position to permit said receiving portion of said housing to freely receive the spherically-shaped forward side of said enlarged portion in mating engagement therewith, and an extended and locked position to engage said spherically-shaped rearward side at a plurality of points spaced circumferentially thereabout to urge said enlarged portion into continual positive contact with said housing to restrain said coupling members against relative axial separation;

and means for pivotally moving said cam members toward said extended and locked position and for holding said cam members in said locked position, said moving means including an annular sleeve disposed in encircling relationship about said cam members to effect pivotal movement of said cam members toward said extended and locked position.

4. Apparatus as defined in claim 3 wherein:

said annular sleeve is movable axially relative to said housing;

and said annular sleeve and cam members include tapering surfaces mateably engageable with each other, whereby when said annular sleeve moves axially in one direction said cam members will be biased towards said extended and locked position.

5. Apparatus as defined in claim 4 wherein:

said annular sleeve and cam members also include oppositely tapering surfaces mateably engageable with each other, whereby when said annular sleeve moves axially in the opposite direction said cam members will be biased towards said retracted position.

6. Apparatus as defined in claim 3 wherein:

said annular sleeve and said cam members include mateably engageable tapering surfaces which cooperate to form a self-locking connection in said extended position.

7. Apparatus for connecting the ends of two pipes comprising:

a pair of coupling members, each of which is connectible at one end thereof to the end of one of said pipes;

one of said coupling members having attached to the other end thereof an annular spherically-shaped enlarged portion having axially forward and rearward sides;

the other coupling member having attached to the other end thereof a housing having a portion with an internal surface for receiving the spherically-shaped forward side of said enlarged portion in mating engagement therewith, thereby enabling the central axes of the respective coupling members to be inclined at an angle relative to each other for connecting similarly inclined pipe ends;

seal means supported by said housing and extending axially outwardly therefrom to be engaged by each said cam member in said extended and locked position, whereby said seal means is compressed between said enlarged portion and said housing to provide a fluid seal therebetween;

a plurality of cam members supported by said housing in circumferentially disposed relation thereabout and pivotally movable between a retracted position to permit said receiving portion of said housing to freely receive the spherically-shaped forward side of said enlarged portion in mating engagement therewith, and an extended and locked position to engage said spherically-shaped rearward side at a plurality of points spaced circumferentially thereabout to urge said enlarged portion into continual positive contact with said housing to restrain said coupling members against relative axial separation;

and means for pivotally moving said cam members toward said extended and locked position and for holding said cam members in said locked position.

8. Apparatus as defined in claim 7 wherein:

said seal means includes annular elastomeric and rigid sections, said rigid section being mounted between said elastomeric section and said cam members when the latter are in said extended and locked position.

9. Apparatus as defined in claim 8 wherein:

said seal means further includes another annular elastomeric seal section axially spaced from said first mentioned elastomeric section and defining an annular testing chamber therebetween;

and conduit means communicating with said testing chamber for introducing pressurized fluid into said chamber to test said elastomeric sections.

* * * * *